(No Model.)
G. T. WARWICK.
VEHICLE WHEEL.
No. 399,453. Patented Mar. 12, 1889.
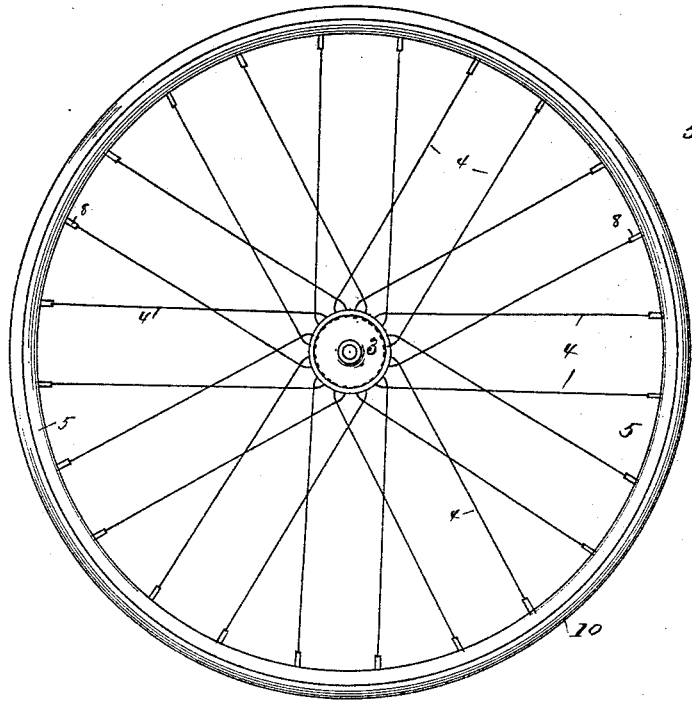
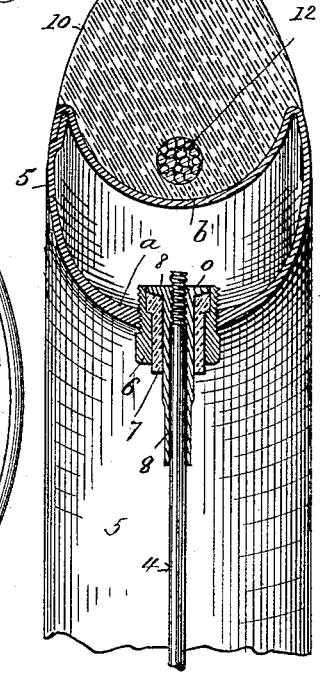
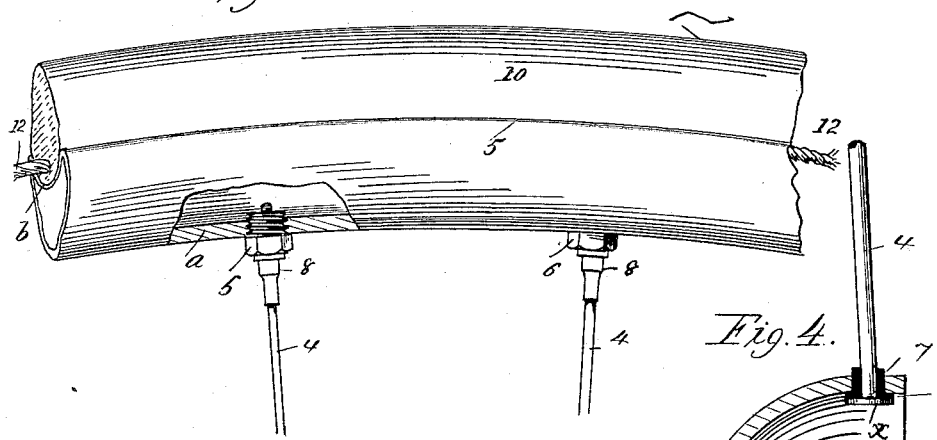
Witnesses
Wm. F. Bellows
G. M. Chamberlain
Inventor,
Geo. T. Warwick,
By his Attorneys, Chapin & Co.

UNITED STATES PATENT OFFICE.

GEORGE T. WARWICK, OF SPRINGFIELD, MASSACHUSETTS.

VEHICLE-WHEEL.

SPECIFICATION forming part of Letters Patent No. 399,453, dated March 12, 1889.

Application filed September 3, 1888. Serial No. 284,437. (No model.)

*To all whom it may concern:*

Be it known that I, GEORGE T. WARWICK, a citizen of Great Britain, residing at Springfield, in the county of Hampden and State of Massachusetts, have invented new and useful Improvements in Vehicle-Wheels, of which the following is a specification.

This invention relates to vehicle-wheels, and more particularly to wheels for bicycles and similar vehicles, the object being to provide an improved wheel in respect to connections between the ends of the spokes and the wheel rim and hub and to a certain construction of the elastic or rubber tire, all as hereinafter fully described, and pointed out in the claim.

In the drawings forming part of this specification, Figure 1 is a side view of a wheel; and Fig. 2, an enlarged transverse section of the rim and tire of the wheel and devices for securing the spokes to the rim, illustrating my improvements, the last-named figure showing the end of a spoke attached to the rim. Fig. 3 is a perspective view of a section of the rim and tire of the wheel, one side of the rim being shown partly broken away and parts of spokes being shown connected therewith. Fig. 4 is a section of one end of the wheel-hub, showing one end of a spoke attached thereto according to my invention.

In the drawings, 3 is the hub of the wheel, constructed in the usual manner, and having perforations through the border thereof to receive the inner ends of the spokes 4. The rim 5 of the wheel is tubular, and is made preferably of sheet metal, in the form, in section, shown in Figs. 2 and 3, having a thickened bottom at $a$, to which the outer ends of the spokes are secured, and a tire-groove, $b$, in its periphery. The said thickened inner side of the rim 5 is perforated and tapped to receive the tubular nut 6, which constitutes the means of connecting the ends of the spokes therewith, together with intermediate devices, below described.

The essential object of the within-described improvements in the devices for attaching the ends of the spokes of the wheel to the rim and hub thereof is to avoid the effects of rigid unyielding connections between said parts, thereby conducing to the easy running and use of the vehicle using wheels so made, to durability, and to the comfort of the rider; and the purpose of the below-described improvement in the tire of the wheel is to cause the tire to better retain its place on the rim and to obviate the tendency of the tire, when held on the rim by cement only, to roll up under a heavy load or when rolling against an obstruction in the road and finally become loosened from the rim.

In attaching the spokes to the hub and rim of the wheel, as aforesaid, each or both ends of said spokes embody in their attaching devices an elastic thimble, 7, of rubber or of similar material, which receives the strain of the spoke under the normal tension of the wheel or when subjected to a load. In Fig. 2 said elastic thimble 7 is placed within said tubular nut 6, and the latter and said thimble are so formed, as shown, that the thimble cannot be drawn outwardly through the nut by any strain to which the spoke may be subjected. A second tubular nut or sleeve, 8, is screwed onto the end of the spoke 4 and extends some distance through the thimble 7, beyond the outer end of the latter, and in practice the part of said sleeve 8 near the outer end of the thimble is made of suitable form to receive a wrench by which it is turned in order to adjust the spoke to its proper tension, or it may be turned by any other suitable tool, and said sleeve 8 has a flange on its end within the rim 5, which bears against or is drawn more or less into the end of the thimble 7 when strain is put upon the spoke, and thus said thimble constitutes a cushion-connection between the end of each spoke and the wheel-rim. The said tubular nut 6 also affords means for adjusting the tension of the spoke substantially the same as those above described, said nut being turned by a wrench applied to its outer end. To provide an elastic cushion between the hub end of the spoke and the hub, an elastic thimble, 7, of suitable shape and size, is placed in the spoke-hole of the hub 3, as shown in Fig. 4, and the spoke 4, having a head, $x$, thereon, is passed through said thimble, and the rim $v$ thereof is compressed between said spoke-head and the inner side of the rim of the hub.

Both in the rim and in the hub-connections, above described, the said thimble 7 provides an elastic cushion against tensional as well as any lateral strain on the spokes, and prevents noise from parts in contact, as well as serving the aforesaid purposes.

The improvement in the tire 10 of the wheel, which is of the ordinary rubber construction, consists in making a rubber tire with a core, 12, therein, consisting of a cord of textile material located below the center of the tire or nearer the rim-bearing side thereof than the tread side, so that said cord shall, when the tire is on the wheel, occupy a position relative to the side of the tire nearest the bottom of the rim-groove, substantially such as is shown in Fig. 2. In making the tire with said core of textile material, said core is made in the form of an endless band by splicing or otherwise suitably and firmly uniting the ends thereof, and it is then molded in the rubber tire and becomes a part thereof. In putting said core-containing tire onto the rim 5 of the wheel, the rubber portion of the tire is compressed sufficiently to allow it to be forced over the edge of the rim into the tire-groove $b$, and it is there cemented in the usual way. The core 12, of textile material, being to all intents and purposes stretchless, being of a pliable nature, adapts itself to the tire, and holds the latter closely on the rim and prevents it from stretching and becoming loose by use, and from rolling up or partially folding when the wheel runs over some obstruction on the road, and generally conduces to greater durability of the tire.

What I claim as my invention is—

The wheel-rim 5, having the tubular spoke-holding nut 6, and the spoke 4, having thereon the tubular nut 8 within said nut 6, combined with a rubber thimble interposed between said nuts, on which said inner nut bears, substantially as set forth.

GEO. T. WARWICK.

Witnesses:
G. M. CHAMBERLAIN,
H. A. CHAPIN.